Patented Aug. 24, 1948

2,447,725

UNITED STATES PATENT OFFICE 2,447,725

METHOD OF MAKING SILICATE PLASTICS

William H. Adams, Jr., and Hans H. Lebach, Newark, Del., assignors to Haveg Corporation, Newark, Del., a corporation of Delaware No Drawing. Application April 13, 1943, Serial No. 482,882

7 Claims. (Cl. 106—84)

This invention relates to the art of plastics and is particularly concerned with the provision of a silicate plastic. The plastic composition of matter per se, the method of making it, the method of forming finished articles therefrom as well as the articles themselves are all involved in the invention.

The principal objects of the invention include the provision of an acid and water resistant silicate plastic composition of matter which will remain moldable for relatively long periods of time; the provision of such a composition of matter which can be mixed in large batches and from which relatively large objects can be formed having a degree of structural strength sufficient, for example, to make them practical for many industrial purposes for which no molded units have heretofore been available; the provision of plastic articles which, in addition to being resistant to water and acid, are resistant to other solvents also, such as alcohols, esters, ketones, hydrocarbons, chlorinated hydrocarbons, etc.; the provision of plastic articles which will satisfactorily resist higher temperatures than has been possible with plastics heretofore familiar to those skilled in the art; the provision of plastics which can be made from non-strategic materials; the provision of plastic articles which can be impregnated with a wide variety of liquid impregnants such, for example, as phenolic resins, etc.; the provision of a method of completely converting and hardening articles formed of silicate plastic compositions of matter; the provision of a method of hardening the articles whereby blistering may be avoided; and, in general, to improve the art of making plastic articles both as to methods of procedure and character of the finished product while at the same time reducing costs. Other objects and advantages will occur to those skilled in the art in connection with the following description of the invention.

In preparing our improved silicate plastic composition of matter, we mix, in aqueous solution, an alkali metal silicate, such as sodium silicate, and a suitable quantity of a soluble alkali metal or alkaline earth metal silico-fluoride, such as sodium silico-fluoride. Mixtures of this general nature have been employed heretofore in the manufacture of so-called silicate cements which are adapted to set or harden at ordinary temperatures in a relatively short period of time. This type of mixture, however, is not suitable for the purposes of the present invention because its setting time is so short that it cannot be used for molding operations except, possibly, where relatively great pressures are employed such as are obtainable by use of hydraulic means. In addition, articles of large size, the formation of which requires relatively large batches of material and considerable periods of time cannot be molded at all from such quick setting materials. Cements of this kind have been made from dilute silicates in which the silicate content is in the neighborhood of 30%, the remainder being water, and in which the ratio of the alkali metal oxide to the silica is relatively low, that is, where the quantity of the alkali metal oxide is small in comparison to the quantity of the silica.

As distinguished from these quick setting cements, we have discovered that, if a much more concentrated alkali metal silicate is employed in which the silicate content is in the neighborhood of 45% or more and in which the alkali metal oxide content in relation to the silica content is relatively high, it is possible to produce a plastic composition of matter upon mixture with a soluble silico-fluoride, which mixture will remain soft and moldable for relatively long periods of time. Indeed, we have found that many such mixtures will remain moldable almost indefinitely.

In order to convert and harden articles formed of our improved plastic we raise the temperature, preferably with increase of pressure, whereupon the material will become converted to a final insoluble and infusible state.

In order to obtain the long moldable period which is one of the important features of our invention, we find that the alkali metal silicate employed should have an alkali metal oxide to silica ratio of one or more to approximately 2.4. This relationship, for example, is characteristic of certain grades of commercial silicates known to the market as B, U, C and J silicates, but is not characteristic of those silicates known as K, N and S grades.

In preparing our material we mix an aqueous solution of silicate having a concentration and ratio within the range above specified with a soluble alkali metal or alkaline earth metal silico-fluoride, the quantity of which latter is stoichiometrically sufficient to completely neutralize the alkali metal oxide content of the silicate. Stated in other words, the quantity of the silico-fluoride which should be employed must be at least sufficient to effect complete neutralization of the alkali metal oxide content of the silicate, and this is readily determinable by stoichiometric calculation. Somewhat more of the silico-fluoride than this seems to do no harm unless the excess is of substantial amount.

A typical example of a mixture made in accordance with the foregoing instructions is as follows:

Example 1

Into 240 grams of liquid sodium silicate having a content of 18.0% $Na_2O$, 36.0% $SiO_2$ and 46.0% water (which is the common commercial product known in this vicinity as J brand sodium silicate) is thoroughly mixed 160 grams of finely ground sodium silico-fluoride. This mixture will stay soft and moldable for several days at ordinary temperatures during which time the desired article can be shaped or molded to the form required. After formation, the article can be hardened by placing it in an autoclave at about 100 pounds per square inch pressure and a temperature of about 290 F. for a period of approximately twelve hours. At the end of this time the reaction is complete, the material is hard, mechanically strong, and is not appreciably affected by water, acids or other common solvents.

The particular conditions of pressure and temperature given in the example are not to be construed as definite limits because an almost infinite number of combinations is possible. The pressure is employed in order to prevent blistering which would otherwise occur at the temperature indicated, especially if the temperature were raised relatively rapidly. Blistering is caused by the pressure of the water vapors formed during the heating, but it can be controlled by heating under a pressure which is sufficient to equal or exceed the vapor pressure at the existing temperature.

However, we should like to point out that, for some purposes, blistering of the finished article may not always be objectionable so that the invention is not necessarily to be limited to the employment of pressure during the heating step.

In preparing our material we can add certain fillers to the mixture of alkali metal silicate and the silico-fluoride such, for example, as fibrous asbestos or other chemically resistant fibrous material, and even wood flour, ground quartz, slate dust, diatomaceous earth and others, varying the silicate content as necessary within the limits specified above for securing the proper plasticity of the mass. These fillers can be added in considerable quantity, for instance from about 25% to 75% of the total mass of the mixture. They add greatly to the strength and make it possible to manufacture self-supporting structures of large size such as tanks, pipe, etc. In addition, these fillers will increase the elasticity, shock resistance, etc. of the finished articles.

Some specific examples of moldable compositions of matter containing relatively large quantities of fillers are as follows:

Example 2

Take 135 pounds of liquid sodium silicate solution with a content of 18.0% $Na_2O$, 36.0% $SiO_2$, and 46.0% water (such as is characteristic of the commercial products known in this vicinity as C or J brands) and add thereto 40.5 pounds of finely powdered sodium silico-fluoride and 130 pounds of fibrous asbestos. These should be thoroughly mixed, preferably in a dough-type mixer, for from 8 to 10 minutes, at the end of which time the composition will have a putty-like consistency. The mixture of this example will remain soft and moldable for 24 hours or more, and may be formed into pipes, sheets, tanks, containers, etc. by spinning, rolling or stamping into or onto appropriate molds or mandrels, all at ordinary room temperature.

The molds containing the formed but still soft articles are then placed in an autoclave and baked for about 12 hours at a temperature of about 290° F. and a pressure of about 100 pounds per square inch, at the end of which time the material is converted and the objects are properly hardened and may be removed from the mold. As in the case of Example 1, the articles can be baked at various temperatures and pressures and may even be baked without pressure at a relatively low temperature.

Furthermore, the relative proportions of asbestos and silicate solution may also be varied widely from the above figures without changing the nature of the invention, although we have found that a good practical range will bring the content of silicate solution within from about 30% to 65% of the total mass of the mixture. In addition, the quantity of sodium silico-fluoride may also be varied somewhat, although care must be taken not to reduce this ingredient below the limits required to produce a satisfactorily complete setting of the silicate in a finished article which must be resistant both to water and to acid. The limits of sodium silico-fluoride in the example would be from about 20% to 40% of the C or J brand silicate.

Example 3

Mix 130 pounds of liquid sodium silicate solution with a content of 13.8% $Na_2O$, 33.1% $SiO_2$, and 53.1% water (such as is commercially known in this vicinity as U brand silicate) with 154 pounds of fibrous asbestos and 26 pounds of finely ground sodium silico-fluoride. In this case, the proportions of sodium silico-fluoride to give satisfactory results will vary from about 15 to 30%. The content of sodium silicate and the baking conditions are subject to the same variations as in Example 2.

Example 4

Mix 150 pounds of sodium silicate solution with a content of 18% $Na_2O$, 36% $SiO_2$, and 46% water (C or J brand) with 100 pounds of wood flour and 30 pounds of sodium silico-fluoride. In place of the wood flour, other fillers may be employed, such as ground quartz, slate dust, diatomaceous earth, and others, although it may be necessary to somewhat vary the content of silicate solution in order to maintain the proper plasticity of the mass.

In all of the above examples, in place of the particular grade of silicate specified, we can use other grades within the concentrations and ratios specified, provided the appropriate amount of sodium silico-fluoride or its equivalent is used. The following table is illustrative.

| Grade | Per cent $Na_2O$ | Per cent $SiO_2$ | Per cent $H_2O$ | $Na_2O$ $SiO_2$ | Optimum $Na_2SiF_6$ | Range of $Na_2SiF_6$ |
|---|---|---|---|---|---|---|
| | | | | | Per cent | Per cent |
| U | 13.8 | 33.1 | 53.1 | 1:2.40 | 20 | 15-30 |
| C & J | 18.0 | 36.0 | 46.0 | 1:2.00 | 30 | 20-40 |
| B | 24.2 | 38.7 | 37.1 | 1:1.60 | 35 | 25-45 |

In connection with the hardening step we should like to say again that the preferred procedure involves the application of heat under pressure. This, as stated, will avoid blistering. However, in some instances, blistering, especially if slight, may not be a sufficiently serious objection to render the articles useless. Furthermore, blistering can be minimized or eliminated by employing relatively low temperatures with corresponding increase in the length of time that the articles are heated. Also an extremely gradual elevation of temperature tends to minimize blistering.

Nevertheless, we prefer to harden the articles by a combination of pressure and temperature, and have found that excellent practical results can be secured by elevating the temperature to about 150° F. to 400° F. and that the pressure may vary between 0 and 20 atmospheres. The pressure required to prevent blistering should be at least sufficient to counterbalance the vapor pressure at the chosen temperature and, generally speaking, this will require a pressure which is in the neighborhood of 0 to 5 atmospheres over the vapor pressure.

As stated above, our invention contemplates the production of molded articles which can be impregnated with a wide variety of impregnants. The porosity of articles formed from our improved plastic composition is varied according to proportions and other conditions and will, as a rule, be very low. However, for some purposes a higher porosity may be desirable, and, after hardening, it can be further developed without injury to the structure by leaching with water which serves to remove the soluble salts. Incidentally, to so remove these salts is a useful step because their presence, in some instances, may adulterate or be detrimental to the products ultimately to be handled in containers made from our improved materials.

After the articles are hardened, either with or without the development of additional porosity by leaching, they may be impregnated with materials which permanently seal the pores such, for instance, as silicates either with or without additional quantities of sodium silico-fluoride; liquid, dissolved, or melted resins or rosin; tars; asphalt; calcium chloride followed by magnesium silico-fluoride to form an insoluble deposit of calcium silico-fluoride in the pores; synthetic or natural rubbers; etc.

The use of impregnants makes it possible to produce a finished article having whatever special characteristics may be desired, depending upon the service for which the article is intended, and a marked feature of advantage in the impregnation procedure resides in the fact that much less of the impregnating material is required than would be necessary if the article were composed entirely of the impregnant. For instance, phenol formaledhyde resin has heretofore been used in the construction of plastic materials, and even where large quantities of fillers are employed the quantity of such resin may be as much as 50% by weight. With the present invention this quantity can be markedly reduced and the product still retain the characteristic advantages of a phenol formaldehyde resin because the only quantity necessary is that which is required to close the pores, which may be as little as 15 to 25% by weight. This results in a marked economy in construction costs and, furthermore, is particularly advantageous at the present time when war conditions have made the resins highly strategic materials of which the supply is seriously limited.

In the case of natural or synthetic rubber impregnants the invention is of marked advantage in that it makes possible the use of the excellent physical and chemical properties, especially of some of the more recently developed synthetic rubbers and rubber-like products. Normally, these materials are not suitable for large size self-supporting equipment because their extreme flexibility prevents their use in this way. However, by making the self-supporting body in accordance with our present invention and then impregnating with the desired rubber, it is possible to obtain the valuable properties of the latter and at the same time to overcome their structural deficiencies.

We claim:

1. In the art of molding, the process which includes mixing an aqueous solution of sodium silicate of not less than about 45% concentration and having a soda : silica ratio of one or more to 2.4 and a quantity of sodium silico-fluoride which is at least sufficient to effect complete neutralization of the soda content of the silicate; forming the article from the plastic composition resulting from said mixture; and gradually elevating the temperature until the article is substantially hard.

2. In the art of molding, the process which includes mixing an aqueous solution of sodium silicate of not less than about 45% concentration and having a soda : silica ratio of one or more to 2.4 and a quantity of sodium silico-fluoride which is at least sufficient to effect complete neutralization of the soda content of the silicate; forming the article from the plastic composition resulting from said mixture; and hardening the article by elevating the temperature to about 150° F. to 400° F.

3. In the art of molding, the process which includes mixing an aqueous solution of sodium silicate of not less than about 45% concentration and having a soda : silica ratio of one or more to 2.4 and a quantity of sodium silico-fluoride which is at least sufficient to effect complete neutralization of the soda content of the silicate; forming the article from the plastic composition resulting from said mixture; and hardening the article by elevating the temperature under pressure in excess of the normal vapor pressure at the existing temperature.

4. In the art of molding, the process which includes mixing an aqueous solution of sodium silicate of not less than about 45% concentration and having a soda : silica ratio of one or more to 2.4 and a quantity of sodium silico-fluoride which is at least sufficient to effect complete neutralization of the soda content of the silicate; forming the article from the plastic composition resulting from said mixture; and hardening the article by elevating the temperature to about 150° F. to 400° F. under pressure of from 5 to 10 atmospheres.

5. The process of claim 1 in which there is included in the molding mixture an inert filler.

6. The process of claim 1 in which there is included in the molding mixture fibrous asbestos.

7. In the art of molding, the process which includes mixing an aqueous solution of sodium silicate of not less than about 45% concentration and having a soda : silica ratio of one or more to 2.4, a quantity of sodium silico-fluoride which is sufficient to effect complete neutralization of the soda content of the silicate, and a chemically resistant fibrous filler the quantity of which is from about 25% to 75% of the total quantity of the mix; forming the article from the plastic composition resulting from said mixture;

and gradually elevating the temperature until the article is substantially hard.

WILLIAM H. ADAMS, Jr.
HANS H. LEBACH.

REFERENCES CITED

The following references are of record in the file of this patent:

UNITED STATES PATENTS

| Number | Name | Date |
|---|---|---|
| 1,162,515 | Rickers | Nov. 30, 1915 |
| 2,204,913 | Ruddle | June 18, 1940 |
| 2,208,571 | Dietz | July 23, 1940 |
| 2,323,029 | Goodrich | June 29, 1943 |